Aug. 14, 1956  A. C. PETERSON  2,758,661
COMPOUND PROPULSION SYSTEMS FOR AUTOMOTIVE VEHICLES
Filed Jan. 28, 1952  4 Sheets-Sheet 1

INVENTOR
Adolphe Peterson

Aug. 14, 1956  A. C. PETERSON  2,758,661
COMPOUND PROPULSION SYSTEMS FOR AUTOMOTIVE VEHICLES
Filed Jan. 28, 1952  4 Sheets-Sheet 3

INVENTOR
Adolphe Peterson.

Aug. 14, 1956 A. C. PETERSON 2,758,661
COMPOUND PROPULSION SYSTEMS FOR AUTOMOTIVE VEHICLES
Filed Jan. 28, 1952 4 Sheets-Sheet 4
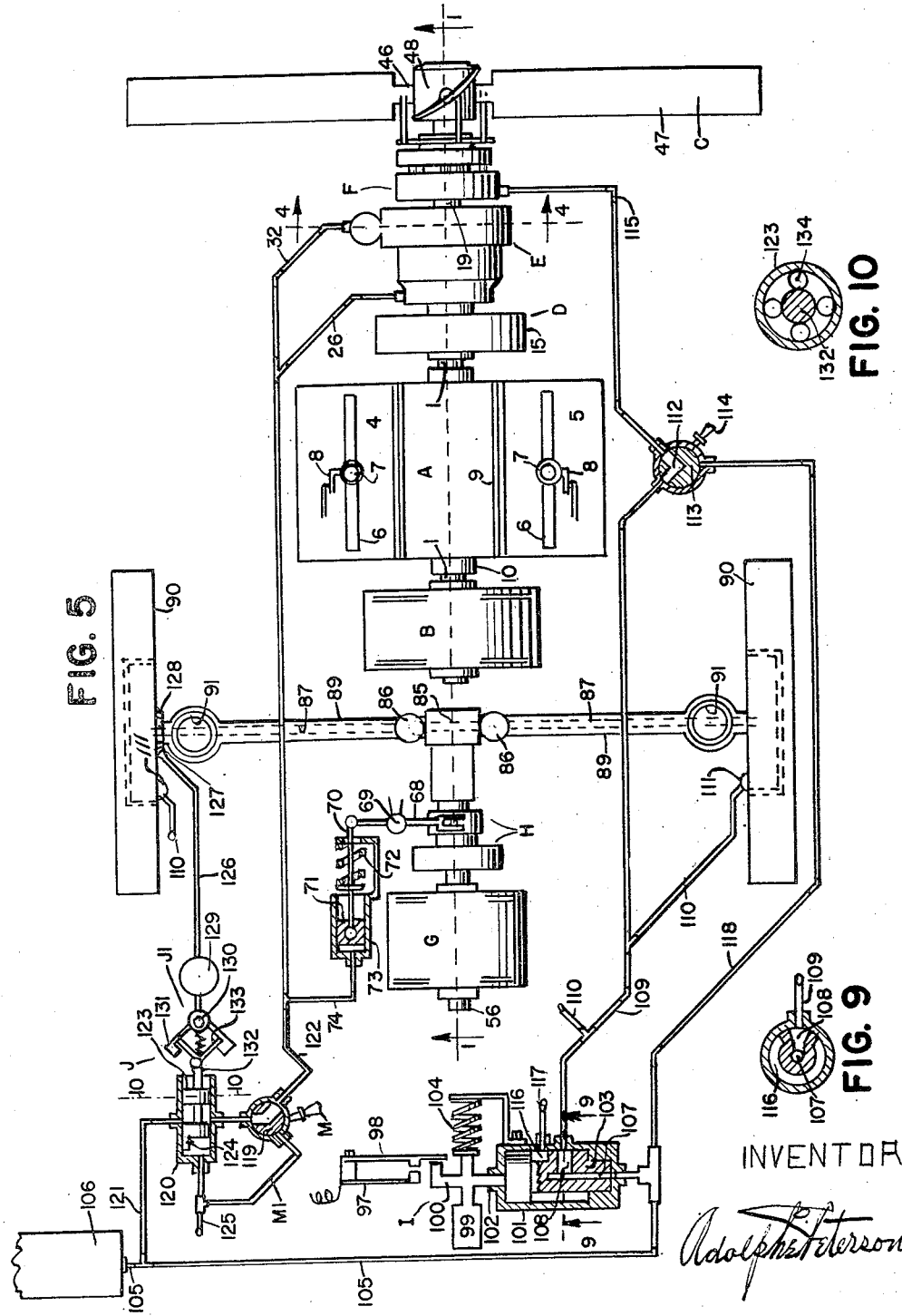
INVENTOR
Adolph C. Peterson.

United States Patent Office 2,758,661
Patented Aug. 14, 1956

2,758,661

COMPOUND PROPULSION SYSTEM FOR AUTOMOTIVE VEHICLES

Adolphe C. Peterson, Edina, Minn.

Application January 28, 1952, Serial No. 268,627

11 Claims. (Cl. 180—54)

My invention relates to automotive vehicle propulsion means and especially to a means which employs a dual system of propulsion, wherefore it is called compound propulsion system for automotive vehicles.

The chief objects of my invention are to provide a propulsion system for automotive vehicles of the higher speed type such as automobiles for highway travel, which means shall in general be somewhat simpler in construction, more effective in the usual fast travel on highways, and at the same time subject to less wear and tear in the propulsion mechanism in such travel. A principal object is to provide a propulsion system which shall be somewhat more economical of fuel at high speed or cross country travel by virtue of two considerations, one that the application of propulsion power is by a means which may be somewhat better than that of the usual automobile in the high speeds, say from forty to seventy miles an hour or more; and two, that because of its means of application of the power of the engine, the engine itself may be made of a rather smaller size or maximum power and thus may be designed to be economical of fuel at the usual traveling speeds, and may also to some extent reduce the weight of engine and fuel carried.

An object is to provide a means of efficiently and safely using air propeller means for vehicle propulsion, such that the advantages of use of this form of propulsion may be available without there being any chance of injury to pedestrians such as there might be in the event of use of such a type of propulsion without such a means as here provided to render such a means harmless to pedestrians. An object is also to provide a means whereby more effective braking of a vehicle may be had, not only in the usual process of stopping a vehicle in traffic and to avoid collisions, but also to provide a means which is effective for braking of a vehicle when descending long hills or mountain roads without such braking impairing or endangering or wearing the usual braking system of a vehicle.

An object is also to provide a means whereby the simple and highly effective use of electric motor drive means may be used as a part of my system of propulsion without the excessive weight and power usually thought to be necessary in use of electric motor drive means for vehicles. An object is also to provide means which will provide more effective control of an automobile in all situations, such for example as avoiding skidding when applying braking at high speeds and when applying high driving power at any speed, and especially in quick acceleration of an automobile from a low to a high speed. In general the object is to improve upon automotive vehicle propulsion means, and incidentally also improvement of braking means for such vehicles.

The principal devices and combinations of devices comprising my invention, are as hereinafter described and as defined in the claims. In the accompanying drawings which illustrated my invention in two general types or forms, like characters refer to like parts throughout the several views, in so far as practicable. Referring to the drawings:

Figure 1 is a view on a vertical longitudinal plane centrally of the chassis of an automotive vehicle embodying a preferred form of my invention, only the rear end of such a vehicle being shown, the front part including the front steering wheels being broken away, some parts being shown in full side elevation, the principal operating parts being shown in vertical section on the lines 1—1 of Figures 2, 5, 6.

Figure 2 is a view of only a part of the drawing mechanism, the engine and some allied parts, these parts being shown in this figure on a scale considerably enlarged over the scale of Figure 1, so that these parts may be shown more clearly and more fully, some parts being shown in full plan view and some parts being shown in section on the line 2—2 of Figure 1, some parts being broken away, and some parts such as the vehicle chassis and wheels being not shown at all.

Figure 3 is an enlarged section on a vertical plane through the wheel driving transmission change means this being a section on the same plane as that of Figure 1, but not showing the engine and other propulsion means.

Figure 4 is a detail vertical section at right angles to the section of Figures 1 and 2, the section being on the line 4—4 of Figures 1 and 2, and 5, some parts being shown in full side view.

Figure 5 is a view in plan to show the control system of the device as applied to the combination principal parts comprising the device, this view being of somewhat diagrammatic character, the engine and its allied parts being shown displaced rearwardly from other parts (that is rightwardly in Fig. 5) in order that the association of parts and their control means, may be more adequately shown, with clearer presentation of control means, all parts being shown in plan view except some control valves and parts, which are shown in section through the parts without reference to the particular elevation or level in the other figures. It should be noted that in this diagrammatic view some minor parts are illustrated as placed on a different side of the major parts with which they are associated, as compared with other figures, in order that the control and association generally may be more completely illustrated.

Figure 9 is a detail view of a valve means being a section on line 9—9 of Figure 5.

Fig. 10 is a detail section transversely of piston valve 123 on line 10—10 Fig. 5, to show the intermediate ball bearing permitting relative rotation of the governor J1.

Figure 1:
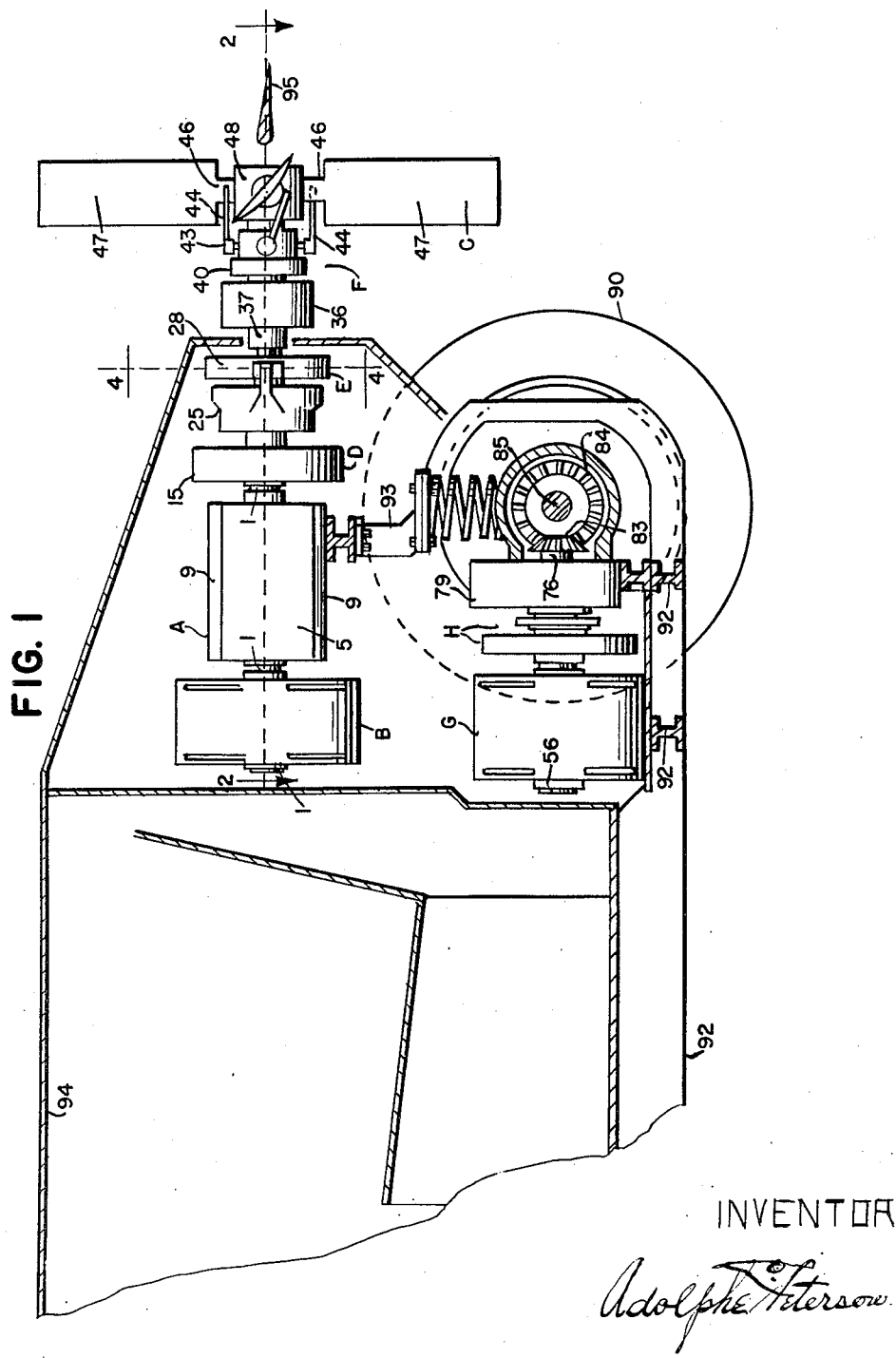
Figure 2:
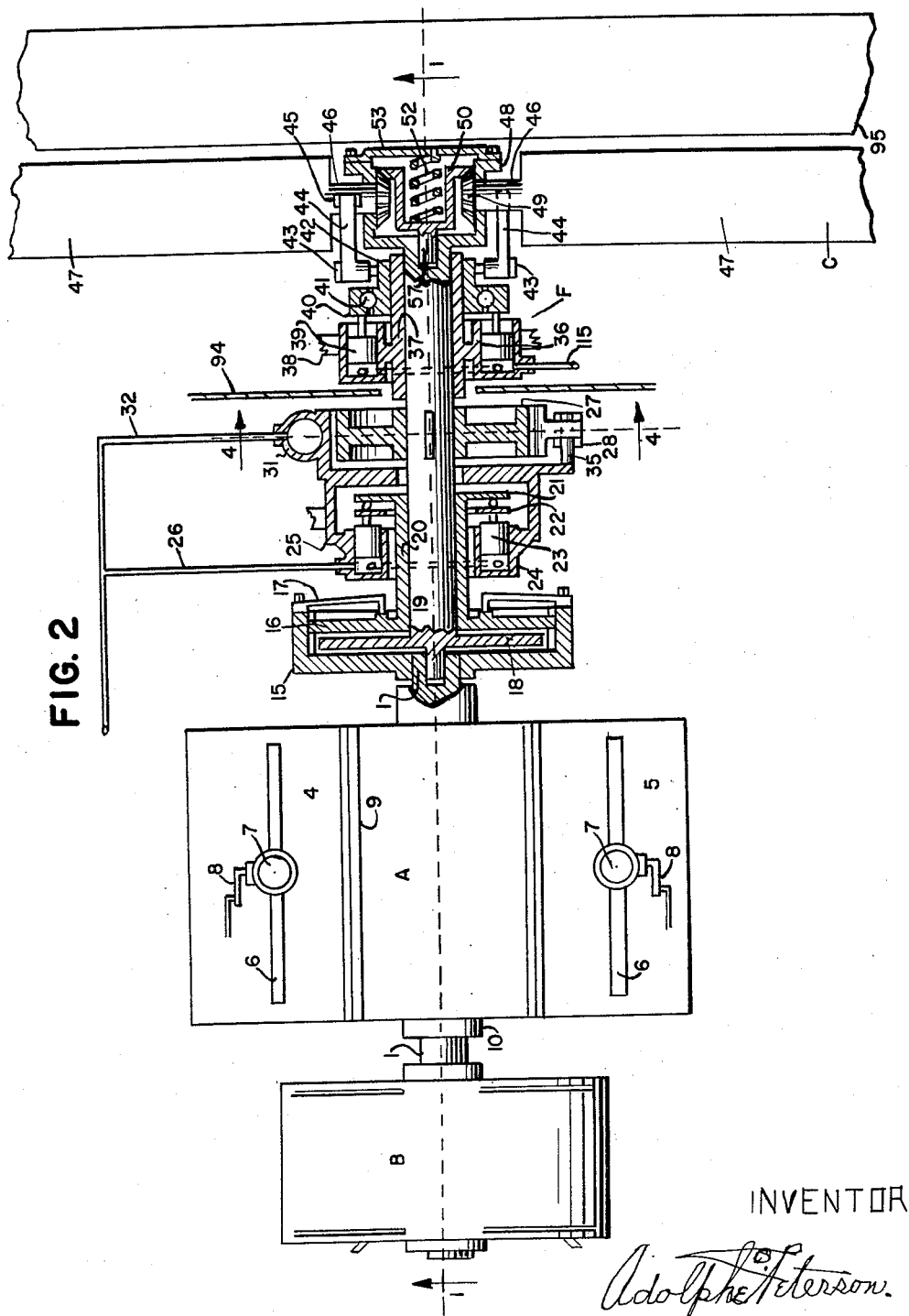
Figure 3:
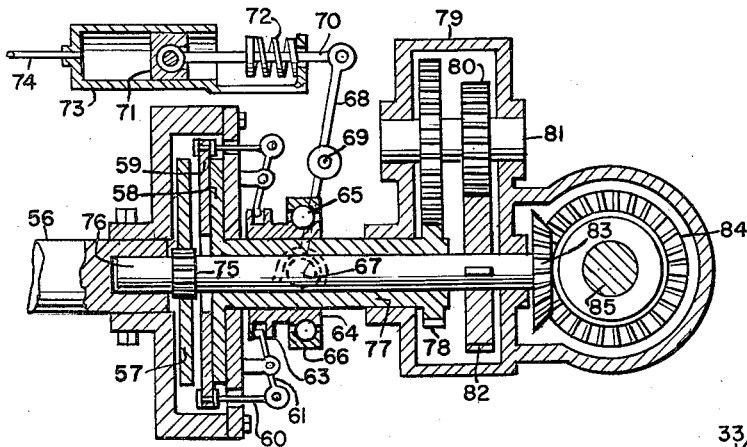

Referring first to the Figures 1, 2, 3, 4, 5, 8, the parts will be generally designated as major parts or units comprising the invention, by letters, as follows: A is an internal combustion engine, which may be of any type such as the usual gasoline engine or diesel type engine, and is shown as an opposed cylinder horizontal type engine; B, an electric generator which may be somewhat larger than the usual electric generator used in automotive vehicles, and may be a high speed type and sufficient to supply all electric needs in the vehicle; C, an air propeller means or air displacement means; D, a clutching means between the engine A and the air propeller means C; E an air propeller braking means applying to the drive shaft of the air propeller C; F, a propeller blade adjusting means; G, an electric motor of a type to receive current for driving it from electric generator B; H, a variable transmission means between the electric motor means G and the vehicle road wheel drive; I, the brake pedal and control valve; J, the speed control means associated with any road wheel, and a valve means.

The foregoing generally designates the units of the means, and hereafter some units and associated parts will be described in detail. And first there will be described, the engine A, its associated air propeller C, and associated controls D, E, and F. The engine A has crank shaft 1, driving or being driven by connecting rods 2, connected with pistons (not shown except at 3 in Figure 1), cylinders in cylinder blocks 4 and 5 on opposite sides of crank shaft 1, inlet manifolds 6, carburetors 7, control valves 8, crank case 9, crank shaft bearings 10. The front end of crank shaft 1 has mounted on it or connected with it to be driven thereby the generator armature 11 rotatable within fields 12, and having commutator 13, and brushes 14. The other end of crank shaft 1 has fixed on it to be driven by it, the flywheel clutch casing 15, its movable disk plate 16, springs 17 for thrusting into engagement the disk plate 16, the engageable driven disk plate 18 fixed on air propeller shaft 19. The movable disk plate 16 is on tubular shaft 20 rotatable over shaft 19 as a bearing and rear end of tubular shaft 20 has flange 21 fixed thereon by which tubular shaft 20 may be thrust rightwardly in Figure 2 by ball-bearing collar runway 22, when the latter is thrust rightwardly by pistons 23 reciprocable in cylinders 24 formed in cylinder mounting 25, when air or fluid under pressure is passed by means of conduit 26 to cylinders 24. The springs 17 will move the clutch plates into engagement when pressure of fluid is released from cylinders 24.

Figure 4:
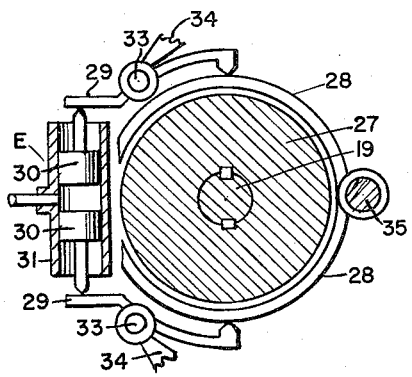

The shaft 19 has also fixed on it the brake drum 27, with which brake shoes 28 may be engaged by levers 29 when the latter at their opposite ends are thrust outwardly, Fig. 4, by pistons 30 in cylinder 31, which will be when fluid under pressure passes into cylinder 31 between pistons 30 from conduit 32. Levers 29 are pivotable on pivots 33 which are fixed on any mounting brackets 34. Brake shoes 28 are pivoted on fixed mounting pin 35, which may be fixed on any mounting means.

The propeller adjusting means F has cylinders 36 axially parallel with axis of air propeller shaft 19. The cylinders 36 are fixed on the bearing mounting means 37 which by brackets 38 is fixed in the chassis or vehicle. The cylinders 36 have pistons 39 reciprocable parallel to axis of air propeller shaft 19 and connected with outer race 40 of ball bearing 41 which by its inner race on tubular shaft 42 may move the latter rightwardly in Fig. 2, to move the pivots 43 fixed on shaft 42, and thereby move connecting links 44 which by their rearward ends are flexibly fixed one on each of several levers 45 each of which is fixed on the root axle 46 of one propeller blade 47, the levers 45 being extended at right angles to axis of the root axle of the blade and away from that axis, so that the propeller blade may thus be turned or adjusted in its angle of incidence by this means, all blades being simultaneously adjusted and to achieve the same effect, forward or rearward propulsion or thrust against the air. The root axles are oscillatively mounted in propeller hub 48 and inwardly of the hub have bevel gears 49 fixed one on each permanently in gear with bevel gear 50 which is on short shaft 51 rotatable in the rear end of shaft 19, so that bevel gear 50 and with it bevel gears 49 and root axles 46 and blades 47 may be automatically turned into the angle of incidence for forward propulsion, by the tension of a coil spring 52 one end of which is fixed to short shaft 51 and the other fixed to the small cover plate 53 bolted on the rear end of hub 48. The thrust of the pistons 39 will turn the blades 47 into the positions of rearward propulsion, as for braking or rearward propulsion, and the spring 52 will turn the blades 47 into the positions for forward propulsion, of the vehicle.

The electric motor G and its associated variable transmission H is now described. The electric motor G has armature 54, rotating within fields 55, and driving shaft 56, between which and a variable gear drive is a clutch of the friction type, see Fig. 3, and the latter may drive either the direct drive clutch plate 57 or the low gear clutch plate 58, which drive being determined by intermediate movable compressing plate 59 which is by short links 60 moved either way axially by pivoted levers 61 links 60 moved either way axially by pivoted levers 61 being pivoted on pivots 62, the inner ends of levers 61 being engaged by collars 63 on tubular shaft or collar 64 which has an inner race engageable by ball bearing 65 within outer race 66, and the latter has pins 67 engaged by lower ends of forked lever 68, the lever pivoted at 69 to be oscillated by connecting link 70 between it and control piston 71 flexibly connected between them, so that piston 71 may thrust forked lever 68 one way and the coil spring 72 may thrust it the other way, the piston 71 being reciprocable in cylinder 73 and thrust outwardly under pressure of fluid from conduit 74. Any means more closely associated with plate 59, as springs may assist in moving the plate 59. The direct drive plate 57 is engaged movably by key means 75 on direct drive shaft 76 and the indirect or low gear plate 58 is fixed on tubular shaft 77 which has fixed on it low gear spur gear 78 which by gears 79, 80 on countershaft 81 drive larger spur gear 82 fixed on shaft 76. Shaft 76 by either drive drives to bevel gear 83 to larger bevel gear 84 and thereby to transverse wheel drive shaft 85.

Figure 7:
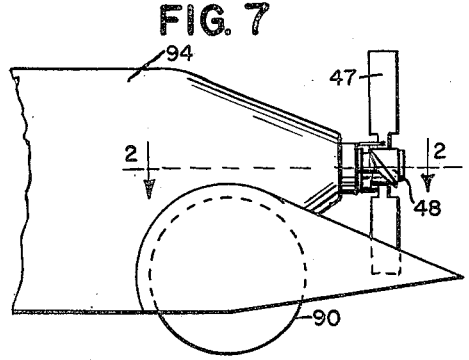
Figure 7 is a side view of the rear part of a vehicle showing the one part of the propulsion means, and without the guard rail being shown, to show use without this guard rail, this view being on reduced scale.

The transverse wheel drive shaft 85 drives by means of universal joints at 86 but not particularly shown to extensions of the shaft 85 at 87 within the wheel supporting axles 89 to the road wheels 90, and the wheel supporting axles 89 support the chassis of the vehicle by means of coil springs 91 which support the vehicle over them, all of such drive means from transverse shaft 85 and such supporting means for the chassis being such as usually used in automotive vehicle construction and being not specifically shown in detailed manner. The engine A is supported on the chassis frame 92 by means of the frame 93 and the generator B is supported by any bracket means in the chassis frame 92. The latter has a vehicle body generally designated as 94 and this is of any type and may be of any stream lined shape which will enable the air propeller to operate efficiently, the invention presented being the propulsion and drive means as described and it is not intended to limit the application of this propulsion and drive means to any particular type or form of vehicle body or automotive chassis construction, it being contemplated that any construction of suitable type may be used with the invention, and that the invention or its parts may be located otherwise with respect to the vehicle as for instance the wheel drive means may be located in the forward part of the vehicle driving front wheels, the illustration being intended to show merely a drive to road wheels in the manner indicated. In any construction the air propeller should be so placed that it is relatively freely exposed to the atmospheric air so that air may flow freely to the air propeller and through it and rearwardly for propulsion. A guard rail 95 of thin flat construction stream lined is placed rearwardly of the air propeller as a guard to the propeller but this is not necessary and may be omitted, as is done in Figure 7, a side view.

Figure 8:
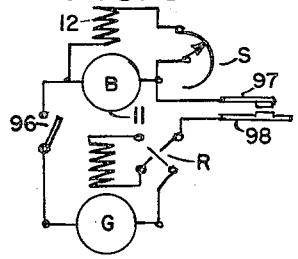
Figure 8 is a diagrammatic view of the motor-generator circuit with its circuit control being diagrammatically shown.
Figure 6:
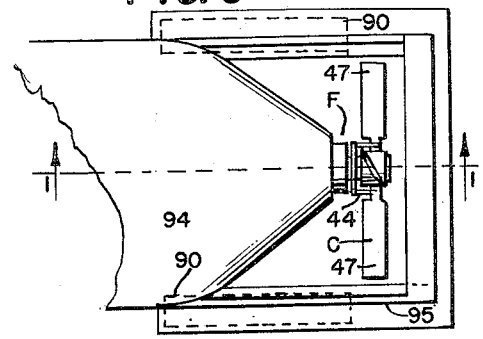
Figure 6 is a plan view of the rear part of a vehicle body, with one part of the propulsion means showing and a guard means, on reduced scale.

Figure 8 shows one type of circuit between the electric generator B and the electric motor G, and this circuit includes the reversing switch R and the rheostat S which may be used to adjust the generating power of the generator B. The circuit to the motor includes a hand switch 96 and also a make and break contact means 97—98, the contact 98 being a spring which is adapted to be moved away from contact 97 to break the circuit to the motor G whenever the vehicle driver depresses the brake pedal lever 99, Figure 5, the contact being broken at the instant the driver starts to depress the braking lever so that this precedes the application of braking power. The pedal lever 99 is fixed on a shaft 100 in valve casing 101, rotatable in the bearing 102 and the shaft 100 may turn the valve 103 through a portion of one rotation and release of the pedal lever will permit the spring 104 to return the pedal lever and valve 103 to its normal position in valve casing 101. A conduit 105 may deliver fluid under pressure as air from reservoir 106 into bore 107 of valve 103 and this air on further extended movement of pedal lever 99 will pass by port 108 to conduit 109 and thereby by branch conduits 110 to road wheel brake means 111 (this being of any type and merely indicated) to brake road wheels 90. The conduit 109 will simultaneously pass fluid under pressure through port 112 of valve 113, a hand valve turnable by hand lever 114, and by conduit 115 to the cylinder 36 of the air propeller adjusting means F and thereby the pistons 39 will move rightwardly, Fig. 2, and swing the blades 47 on their root axles to the positions for rearward propulsion of the vehicle by thrust forwardly of the air stream and this rearward propulsion effect on the vehicle will be added to the braking effect on the road wheels 90 to quickly bring the vehicle to a stop and without as great wear on wheel brakes and tires as is customarily the case. Release of the pedal lever 99 by the driver will return the valve 103 to its normal position and then port 108 will be closed to conduit 109 and conduit 109 will be opened to release space 116 of valve casing 101 and the fluid from conduit 109 will be released to release conduit 117 so that road wheel brakes will be released and the air propeller blades 47 will be returned to normal vehicle forward propulsion angle or incidence by the coil spring 52, Fig. 2.

At any time the driver may by hand lever 114 turn valve 113 to permit fluid under pressure to flow directly from conduit 105 to conduit 118 and through port 112 of valve 113 to the cylinders 36 to thereby turn the air propeller blades 47 into the air braking positions that is with the air propeller producing forward thrust on the air stream to produce rearward thrust on the vehicle, and this air braking effect may thus be used for vehicle braking at any time as when descending hills or mountain inclines, without at the same time engaging the road wheel brakes and increasing wear on such road wheel brake means. Normally valve 113 is placed and retained in the position so that it will permit air braking effect and road wheel braking effect at the same time. It should be noted, however, that braking effect from the air propeller C will always cease, in the usual course of driving, when the vehicle road speed slows to a speed below the critical or determining speed which may be say eight to ten miles per hour, but the driver may, in unusual circumstances eliminate the automatic control according to vehicle speed, by means of a hand valve 119 which normally is placed to permit passage through its port from automatic valve unit 120 from conduit 121 to conduit 122, but which may be manually turned by the driver to permit fluid under pressure to flow directly from conduit 122 to conduit 125, thus permitting the blades 47, that is the air propeller C to be revolved as a unit for braking effect, even at the very slow speeds under eight to ten miles per hour. And this same effect in the low speed range, below ten miles, may be similarly obtained for assistance in vehicle propulsion, at any time, as when the vehicle is stalled in ruts or snow.

The automatic valve unit 120 automatically controls flow from conduit 121 to conduit 122 in all normal driving, and this condition should normally and always prevail, except when the driver has an unusual need for braking, as in very slippery conditions or when there is no danger to pedestrians in traffic. The unit 120 has a piston valve 123 therein which normally permits (in speeds under critical speed) fluid under pressure to flow from conduit 121 to conduit 122, but which, when moved rightwardly, Fig. 2, will by lip 124 of valve 123 close passage of fluid from conduit 121 to conduit 122 and permit release of fluid from conduit 122 to conduit 125 a release conduit, this release of fluid, as hereinafter described, permitting engagement of clutch D and release of air propeller braking means E, to procure the normal driving or propulsion condition for all speeds over the critical speed of say eight to ten miles per hour. This normal speed condition is obtained by release of fluid from the conduit 26 and 32, which control the clutching means D and the braking means E, as was described.

The critical speed, which may be a speed of say eight to ten miles per hour, or such speed somewhat over that speed, as may be determined to be the safe speed, is the speed at which the vehicle travels at such speed over the roadway, that its speed surpasses that of any pedestrians who might walk into the side of the vehicle or the air propeller. That is at speeds under the critical speed the air propeller C is not only free from driving propulsion by engine A but is also braked by brake means E so that it cannot rotate at all, but is stopped. At speeds over this critical speed of say eight to ten miles per hour or slightly more, if deemed necessary, the air propeller C is automatically clutched by clutch means D to engine A but is also released from braking by brake means E, so that air propeller C is thus effective at all speeds over the critical speed to rotate and drive the vehicle by propulsive thrust against the air stream passing the vehicle. This air thrust is thus effective under all normal driving conditions, to assist in propulsion of the vehicle and to contribute at least one-half or even more of that driving thrust as may be determined by the particular construction.

The speed control means J includes a fly-weight governor unit J1, which is revolved by a shaft 126, which is by small bevel gear 127 driven by bevel gear 128 which is fixed to rotate with one road wheel 90 (which may be either a vehicle front wheel or rear wheel) at the same speed as the road wheel 90. The shaft 126 may be any type of flexible operating cable such as is commonly known and used and may also drive the speedometer unit 129 which is diagrammatically shown as included in the drive through shaft 126 from road wheel 90 to governor unit J1. The shaft 126 drives rotatably the pivot 130 on which governor weights 131 are pivoted, so that these governor weights will in the manner of such governors of centrifugal type, be extended radially outwardly from the axis of rotation and will thereby pull shaft 132 by links 133 and through the medium of ball bearing 134 (Fig. 10) will by the same extent pull the piston valve 123 rightwardly, Fig. 5, to close the passage of fluid under pressure from conduit 121 to conduit 122, the lip 124 then shutting off the passage from conduit 121, while at the same time fluid under pressure in conduit 122 will be released to release pipe 125. In this manner when the vehicle road speed exceeds say the eight to ten mile per hour, critical speed, fluid pressure will be released from the cylinders 24 thereby permitting clutch D to engage and will be simultaneously released from brake cylinder 31 thereby permitting brake shoes 28 to be released, and simultaneously fluid pressure will be released from the cylinder 73 so that the low speed clutch plate 58, shaft 77, and spur gear 78 will be disengaged and the direct drive through clutch plate 57 to drive shaft 76 will be engaged. Under this condition, so procured by the action and determination of governor J1, the engine A transmits driving power to shaft 19 and thereby to air propeller C, rotating the latter. Conversely, whenever the vehicle road speed decreases to a speed below the critical speed, 8 to 10 miles per hour, the governor J1 will cause the reverse action of control piston valve 123, and then fluid pressure will flow immediately from reservoir 106 through conduit 122 and conduits 26, 32, disengaging clutch D, engaging brake means E to stop rotation of air propeller C, and simultaneously fluid will flow through pipe 74 to cylinder 73, thereby moving piston 71 to cause direct drive to be disengaged from shaft 76 and causing the low speed through shaft 77 and gears 78, 79, 80, 82, to be engaged.

Under the low speed drive, as stated, the electric motor G will drive to gears 83, 84, and road wheels 90, at a very highly reduced ratio of drive, which reduction may be even as much as thirty to one to the road wheels 90, since this low gear ratio of drive is not employed except at the very low vehicle speeds under the critical speeds of eight to ten miles per hour.

Since the low speed drive to road wheels 90 is at such a high ratio of reduction, the electric motor G need not be of great power, and it is contemplated that, in the direct drive through plate 57 to gear 83, the electric motor need supply not more than one-half of the driving power for vehicle propulsion, and may even be proportioned to provide only say as much as one third of the propulsive power for the vehicle at vehicle speeds over the critical speed. This proportion of drive will depend in any particular construction, on the partciular characteristics reqired in the vehicle. By means of the rheostat S (which may be omitted from the construction), the driver may if he desires adjust the proportion of driving power which is delivered through electric generator B to the motor G, so that this may deliver a larger or smaller proportion of power, or by this means, the relative operation may be adjusted so that the rotational speed of crank shaft 1, and shaft 19 may be varied to procure a higher or lower speed of air propeller C and the armature of the generator B. Hand switch 96, in operation, is normally kept closed, but is available at any time to prevent transmission of power to road wheels 90. Reversing means R may be used at any time, the vehicle being at a stand still, to procure reverse travel of the vehicle chassis, the air propeller C then being braked and released from the crank shaft 1 and not functioning.

It may be noted that in any construction, the electric motor G may be made proportionately stronger, so that for low speed travel, below the critical speed, this motor may adequately supply driving power for low speed, without the need of the low speed transmission provided by the variable drive means H, the motor G then driving directly to gear 83 or through any permanently geared transmission. In such case, in an emergency the driver may use the air propeller for additional propulsive power, by turning valve 119 to an alternative release position by means of handle M to release fluid from conduit 122 through by-pass pipe M¹.

Any additional means may be used for varying the angle of incidence of blades 47 of air propeller C, to thereby provide additional means for adjustment of driving propulsion.

While I have shown particular devices and combinations of devices in the illustration of my invention, I contemplate and intend that other detailed devices and combinations of devices may be used in the realization of my invention, without departing from the spirit and contemplation of my invention.

What I claim is:

1. In automotive vehicle propulsion means, an engine having an engine drive shaft, a road wheel means, an air propeller means, a driving energy transmitting means to transmit driving energy from the said engine drive shaft to the said road wheel means to provide driving torque for rotation of the said road wheel means, a transmission from the engine to the air propeller means to drive the air propeller means and a clutching means interposed in said transmission to the air propeller means to provide for engagement or disengagement of the drive to the air propeller means, a vehicle speed measuring means and means in control of the vehicle speed measuring means to engage the clutching means in the transmission to the air propeller means when vehicle travel speed exceeds a predetermined vehicle travel speed as determined by the vehicle speed measuring means, and to disengage the clutching means in the transmission to the said air propeller means when vehicle travel speed as determined by the vehicle speed measuring means is less than the predetermined vehicle travel speed.

2. In automotive vehicle propulsion means, an engine having an engine drive shaft, a road wheel means, an air propeller means, a drive means between the said engine drive shaft and the road wheel means, the said drive means including an electric generator means driven by the said engine drive shaft and an electric motor means having a driving connection to the said road wheel means and electric conduction means between the electric generator means and the electric motor to convey driving current, a transmission from the said engine drive shaft to the air propeller means to drive the air propeller means and a clutching means interposed in said transmission to the air propeller means to provide for engagement or disengagement of the drive to the air propeller means, a vehicle speed measuring means and means in control of the vehicle speed measuring means to engage the clutching means in the transmission to the air propeller means when vehicle travel speed as measured by the vehicle speed measuring means is in excess of a predetermined speed and to disengage the clutching means to the air propeller means, when vehicle travel speed as measured by the vehicle speed measuring means is less than the said predetermined speed.

3. All of the means as described and as claimed in claim 1 and in combination therewith a braking means to brake the air propeller means against rotation, when the clutching means to the air propeller means is disengaged.

4. All of the means as described and as claimed in claim 2 and in combination therewith a braking means to brake the air propeller means against rotation, when the clutching means to the air propeller is disengaged.

5. All of the means as described and as claimed in claim 1 and in combination therewith, means to effect reversal of the propulsion effected by the said air propeller means.

6. All of the means described and as claimed in claim 2, and in combination therewith, means to effect reversal of the direction of propulsion effected by the said air propeller means.

7. In automotive vehicle propulsion means, a primary power source, a road wheel means, an air propeller means, an electric generator means driven by the primary power source and an electric motor having a driving connection to the road wheel means to drive the road wheel means, electric conduction means between the electric generator and the electric motor to convey driving current, a driving connection between the primary power source and the air propeller means including a clutching means for engagement or disengagement of the drive to the air propeller means, a vehicle speed measuring means and means in control of the vehicle speed measuring means to engage the clutching means in the transmission to the air propeller means when vehicle travel speed exceeds a predetermined speed and to disengage the clutching means in the transmission to the air propeller means when vehicle travel speed is less than the predetermined travel speed.

8. In automotive vehicle propulsion means, a primary power source, a road wheel means, an air propeller means, an electric generator means driven by the primary power source and an electric motor having a driving connection to the road wheel means to drive the road wheel means, electric conduction means between the electric generator and the motor to convey driving current, a rotary driving connection between the primary power source and the air propeller means including a clutching means for engagement or disengagement of the drive to the air propeller means, a low speed transmission and a high speed driving transmission in the driving connection between the electric motor and the road wheel means, clutching means to engage either the said low speed or the said high speed transmission, a vehicle speed measuring means and means in control of the said vehicle speed measuring means to engage the clutching means in the transmission to the air propeller means and engage the said high speed driving transmission when the vehicle travel speed exceeds a predetermined speed and to alternatively disengage the said clutching means to the air propeller means and engage the said low speed driving transmission when travel speed is below the predetermined speed.

9. In automotive vehicle propulsion means, a primary power source, a road wheel means, an air propeller means, an electric generator means driven by the primary power source and an electric motor having a driving connection to the road wheel means to drive the road wheel means, electric conduction means between the electric generator and the electric motor to convey driving current, a driving connection between the primary power source and the air propeller means including a clutching means for engagement or disengagement of the drive to the air propeller means, an air propeller braking means, a vehicle speed measuring means and means in control of the vehicle speed measuring means to engage the clutching means in the transmission to the air propeller means when vehicle travel speed exceeds a predetermined travel speed and to disengage the clutching means in the transmission to the air propeller means and to engage the said air propeller braking means when vehicle travel speed is less than the predetermined travel speed.

10. In automotive vehicle propulsion means, a primary power source, a road wheel means, an air propeller means exposed to the air stream in vehicle travel for propulsive thrust against the air stream, a driving connection between the primary power source and the air propeller means the driving connection including a clutching means for engagement or disengagement of the drive to the air propeller means, a drive means between the primary power source and the road wheel means including an electric generator means driven by the primary power source and an electric motor having a driving connection to the road wheel means and electric conduction means between the electric generator means and the electric motor to convey driving current, a fluid pressure actuated means operable under pressure of fluid to disengage the clutching means between the air propeller and the primary power source and means automatically engaging this clutching means under release of the fluid pressure, a vehicle speed measuring means susceptible to control movement acording to the vehicle travel speed, a valve means operable according to the movement by the vehicle speed measuring means to effect movement of fluid under pressure from a fluid pressure source to the fluid pressure actuated means when vehicle travel speed is less than a predetermined travel speed and operable to prohibit such flow and effect release of fluid under pressure from the fluid pressure actuated means when vehicle travel speed exceeds the said predetermined travel speed.

11. In automotive vehicle propulsion means, a primary power source, a road wheel means, an air propeller means exposed to the air stream in vehicle travel for propulsive thrust against the air stream, a driving connection between the primary power source and the air propeller means the driving connection including a clutching means for engagement or disengagement of the drive to the air propeller means, a drive means between the primary power source and the road wheel means including an electric generator means driven by the primary power source and an electric motor having a driving connection to the road wheel means and electric conduction means between the electric generator means and the electric motor to convey driving current, an air propeller braking means effective to brake the air propeller means, a fluid pressure actuated means operable under pressure of fluid to disengage the clutching means between the air propeller means and the primary power source and concomitantly effect braking of the air propeller means by the air propeller braking means and alternatively to permit engagement of the clutching means and disengagement of the said air propeller braking means, a vehicle speed measuring means susceptible to control movement according to the vehicle travel speed, a valve means operable according to the said control movement of the vehicle speed measuring means to alternatively effect the first named declutching and braking of the air propeller means or in an opposite phase to effect engagement of the said clutching means for the air propeller means and disengagement of the said braking means for the air propeller means.

References Cited in the file of this patent

UNITED STATES PATENTS

| 1,044,945 | Tampier | Nov. 19, 1912 |
| 1,373,099 | Ross | Mar. 29, 1921 |
| 1,407,048 | Turner | Feb. 21, 1922 |
| 1,420,783 | Swencki | June 27, 1922 |
| 1,951,089 | Fielder | Mar. 13, 1934 |
| 2,120,104 | Livermore | June 7, 1938 |

FOREIGN PATENTS

| 561,432 | France | Aug. 6, 1923 |
| 476,152 | Great Britain | Dec. 2, 1937 |